United States Patent [19]
Bettoli et al.

[11] 3,844,814
[45] Oct. 29, 1974

[54] FOAMED DECORATIVE COVERING MATERIAL AND METHOD OF MANUFACTURE

[75] Inventors: Phillip S. Bettoli, Martinsville, N.J.; Edward R. Erb, Geryville, Pa.

[73] Assignee: General Aniline & Film Corporation, New York, N.Y.

[22] Filed: July 6, 1966

[21] Appl. No.: 563,157

[52] U.S. Cl. ............... 117/11, 156/79, 161/124
[51] Int. Cl. ..................... B44d 1/32, D21h 1/10
[58] Field of Search ............ 156/79; 117/10, 11, 8.5

[56] References Cited
UNITED STATES PATENTS

| | | | |
|---|---|---|---|
| 3,293,094 | 12/1966 | Nairn et al. | 156/79 |
| 3,293,108 | 12/1966 | Nairn et al. | 156/79 X |
| 3,365,353 | 1/1968 | Witman | 156/79 X |
| 3,373,072 | 3/1968 | Jones | 156/79 X |
| 3,382,194 | 5/1968 | Birkett | 117/11 X |
| 3,386,878 | 6/1968 | Pooley | 156/79 X |
| 3,399,106 | 8/1968 | Palmer et al. | 117/10 X |

*Primary Examiner*—David Klein
*Attorney, Agent, or Firm*—Walter C. Kehm; Samson B. Leavitt

[57] ABSTRACT

A method for making a sheet type decorative covering product having relief and color pattern effects in registry with each other, comprising application of a coating of liquid resin material to a base sheet, the coating containing an uncatalyzed foaming agent, after gelling of the coating and before decomposition of the foaming agent printing a decorative pattern in spaced pattern areas with a printing composition containing an agent for deactivating the catalytic action of catalysts for lowering the decomposition temperature of blowing agents, applying a transparent coating of a resin material having dispersed therein a catalyst for the blowing agent, and heating the product sufficiently to fuse the resin materials and decompose the blowing agent in areas between the printed areas.

1 Claim, 5 Drawing Figures

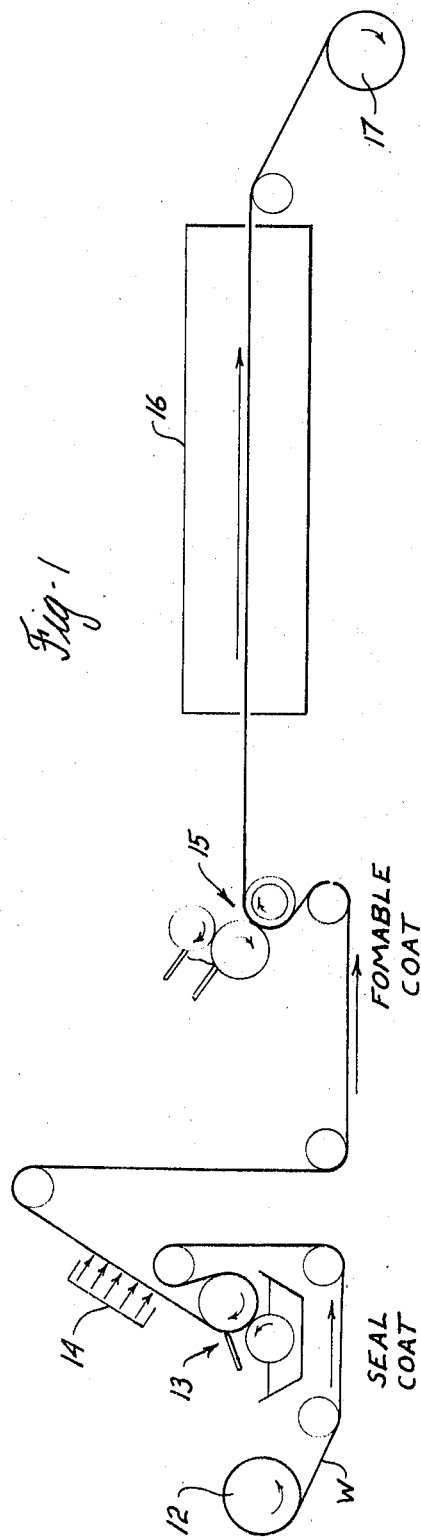
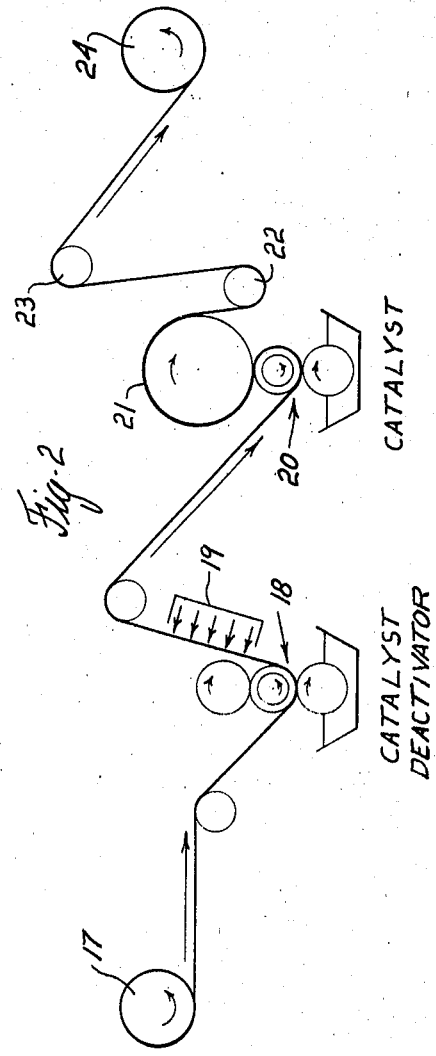

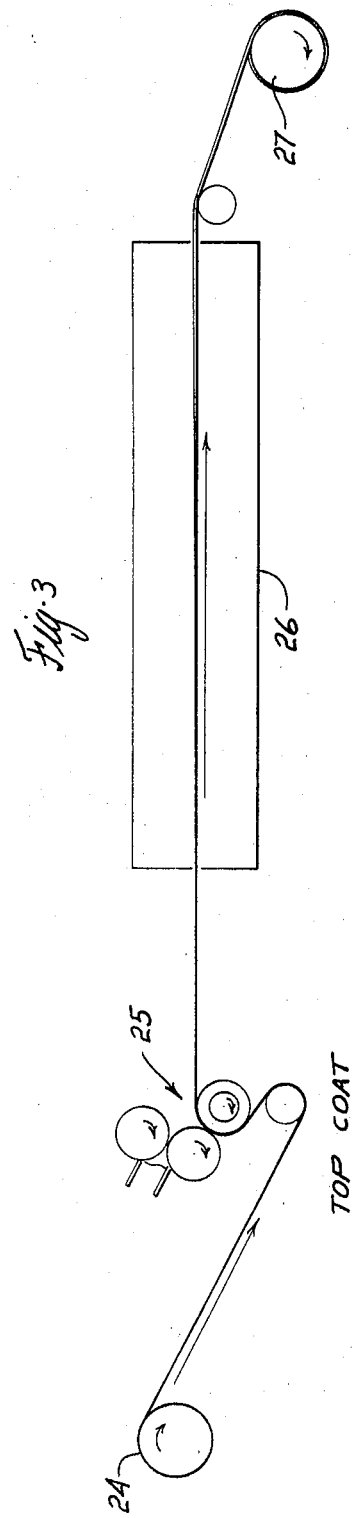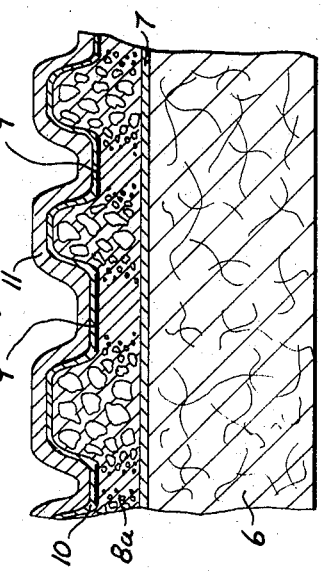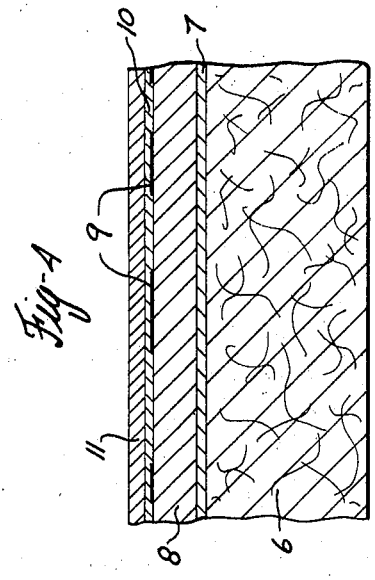

FOAMED DECORATIVE COVERING MATERIAL AND METHOD OF MANUFACTURE

STATEMENT OF INVENTION, OBJECTS AND ADVANTAGES

This invention relates to the production of decorative covering materials, particularly such covering materials having a relief pattern effect produced by providing a foamed or cellular structure in selected pattern areas of the product.

The invention is particularly concerned with decorative covering materials of the kind referred to which are made of vinyl resins, the foamed or cellular structure being provided by selective decomposition of a foaming or blowing agent dispersed in the resin material, so that in selected areas the foaming agent is extensively decomposed, thereby correspondingly increasing the porosity and thickness of those selected areas as compared with other areas, according to a desired relief pattern in the product. The invention, moreover, is especially concerned with products having a relief pattern effect of the kind referred to and also having a color pattern effect, preferably in registry with the relief pattern effect. Such products have a wide range of uses, but are of special use in the field of floor, wall and upholstery coverings.

Certain techniques for the production of products of the kind above referred to are already known, for instance techniques in which a resin layer of the product has a foaming agent dispersed therein and in which there is printed thereon, in selected pattern areas, a composition containing either an agent for catalyzing the decomposition of the foaming agent and thus lowering its decomposition temperature, or an agent for inhibiting or suppressing the decomposition of the foaming agent. In either event, when such an agent is printed upon the product in selected areas, and thereafter the product is heated to effect decomposition of the foaming agent, a relief pattern effect is developed, because the printed and unprinted areas expand to different degrees.

According to the present invention, instead of printing a catalyst or an inhibitor for the foaming agent, a multiple element laminate is formed, one element of which comprises a first layer of resin material having the foaming agent dispersed therein, a second element of the laminate comprises a second layer of resin material having dispersed therein a catalyst for lowering the decomposition temperature of the foaming agent, and a third element of which comprises a composition applied in selected pattern areas, the applied composition containing an agent for deactivating, destroying, or suppressing the catalytic agent. In view of this, in the pattern areas to which the deactivator has been applied and the catalyst destroyed, the foaming agent will not decompose at the temperature which is effective for decomposition of the foaming agent in the areas between those pattern areas. In accordance with the invention, in this laminate, the composition containing the deactivator for the catalyst is applied in spaced pattern areas lying at one face of the layer containing the catalyst and preferably between the foamable layer and the catalyst layer. After formation of the laminate referred to, it is heated, and this causes the portions of the catalyst which remain active to penetrate the foamable layer, in view of which the decomposition of the foaming agent is selective, i.e., in the areas of the product where the deactivating agent has not been applied, the catalyst remains active, thus lowering the decomposition temperature of the foaming agent, whereas in the areas where the deactivating agent has been applied, the ability of the catalyst to lower the decomposition temperature of the foaming agent has been destroyed. In the preferred embodiment referred to, where the deactivating agent lies between the foamable layer and the catalyst layer, the deactivator "shields" the foaming agent in the foamable layer from the catalyst, thus insuring against lowering of the decomposition temperature of the foaming agent by the action of the catalyst in the areas in which the deactivator is applied. This enables decomposition of the foaming agent in catalyzed areas and also fusion of the resin materials at a temperature well below that at which the uncatalyzed foaming agent would decompose. In this way a relief pattern effect is developed.

The foregoing system of the present invention is of advantage for a number of reasons mentioned just below.

First note that the catalyst layer need only be very thin, so that the deactivator applied in the pattern areas may more readily react with the catalyst throughout the catalyst layer, than in the case where a catalyst for the foaming agent is incorporated in the layer containing the foaming agent, which latter is preferably of greater thickness and thus not as readily penetrated as is a thinner layer.

The technique of the present invention is also of advantage as compared with that prior process in which a catalyst is printed in pattern areas upon a foamable coat, because in the present technique in which the deactivator for the catalyst is applied in pattern areas, it is possible to include coloring material in the deactivator composition, thereby providing for introduction of color in exact registry with the valleys or depressed areas of the relief pattern being produced.

In considering another advantage of the technique of the present invention it is first pointed out that following application of the foamable layer, it is ordinarily necessary to gel the resin material of the foamable layer prior to the application of other materials, such as printing inks. Since the catalyst for lowering the decomposition temperature of the foaming agent is not incorporated in the foamable layer, greater leeway in treatment conditions, such as time and temperature, is permissible in effecting the gelling, because of the very fact that the catalytic agent for lowering the decomposition temperature of the foaming agent is not then present.

The technique of the present invention is still further of advantage in types of product in which it is desirable to apply a top wear layer or coat as in floor coverings, in which case, if desired, the wear layer may incorporate the catalyst for lowering the decomposition temperature of the foaming agent, thereby eliminating the necessity of applying a separate catalyst layer between the top wear layer and the underlying foamable layer with the deactivator printed or otherwise applied thereon. Such a catalyst may readily be incorporated in a clear or transparent wear layer, without appreciably impairing the transparency thereof and thus without obscuring color pattern effects which may be introduced with the deactivator.

According to the invention the multi-element strucutre or laminate of the product is developed in a manner to position the catalyst deactivator in pattern areas in a layer above the layer containing the foaming agent, and pigment or other coloring material is preferably incorporated in the deactivator composition, so that a color pattern effect in registry with the relief pattern effect is visible at the top of the product.

The application of the deactivator composition may be effected in either one or more stages, and different quantities of the deactivating agent may be applied to different areas of the product so that the relief effect in the product may be more pronounced in some areas than in other areas. This may be accomplished in a variety of ways, but a preferred method for most purposes is by printing. Different quantities of the deactivator may be applied to different areas of the product even in a single printing stage, for instance by employment of a rotogravure type of printing roll adapted to apply different quantities of the deactivator composition to different areas of the pattern.

Similarly, color may be introduced into the pattern in one or more stages of printing, and this may be accomplished either in a composition containing the catalyst deactivator or in a composition containing no deactivator, although advantages are gained by utilizing at least one of the stages for applying a deactivator composition to also apply color for development of a color pattern effect in registry with the relief pattern effects.

Both the relief and the color pattern effects obtainable in accordance with the present invention may be of a wide variety of types, including, for example, tile patterns having a network of areas representing mortar joints. More intricate patterns are also obtainable, even floral designs.

BRIEF DESCRIPTION OF DRAWINGS

How the foregoing and other objects and advantages are obtained will appear more fully from the following description having reference to the accompanying drawings in which:

FIGS. 1, 2 and 3 schematically illustrate various stages of a typical operation for producing a typical product according to the invention.

FIG. 4 is a greatly enlarged fragmentary sectional view of a typical floor covering according to the invention as produced by the operation diagrammmed in FIGS. 1-3, FIG. 4 showing the product just prior to the final heating to effect decomposition of the foaming agent and fusion of the resin materials; and FIG. 5 is a view similar to FIG. 4 but illustrating the product in completed condition.

DESCRIPTION OF EMBODIMENT OF PRODUCT SHOWN IN FIGS. 4 AND 5

The product shown in FIGS. 4 and 5 is one adapted for use as a floor covering and is built up upon a felt base indicated at 6 (ordinarily of about 0.04 inch in thickness). As seen in FIG. 4, a sealing or prime coat or layer 7 is applied to one face of the felt base 6, and on this prime coat a layer 8 is applied, this layer comprising resinous material having dispersed therein a foaming agent. There is then printed in selected pattern areas as indicated at 9 a composition containing an agent for deactivating the catalytic action of the catalyst which is subsequently applied in layer 10. The catalyst in layer 10 acts to lower the decomposition temperature of the foaming agent in layer 8 in the areas between those on which the catalyst deactivating agent is applied. Finally, a transparent top coating or wear layer 11 is applied.

As will be more fully developed herebelow, all of the layers referred to are conveniently applied in liquid or soft condition, sufficient heating being introduced between applications in order to solidify and thus facilitate building up the laminate, and when the laminate is completed the product is then subjected to additional heating at a higher temperature sufficient to decompose the catalyzed foaming agent and to effect fusion of various of the resin materials. The temperature used for this purpose is not sufficient to decompose the foaming agent in the areas in which the catalyst in the adjoining layer has been deactivated. The condition of the product after this heating is shown in FIG. 5. Here it will be seen that the foamable layer (indicated at 8a in FIG. 5) has been expanded in selected pattern areas, thus developing a relief pattern effect. Moreover with pigment or other coloring material incorporated in the printing composition 9 the product will also have a color pattern effect in registry with the relief pattern effect.

In considering FIGS. 4 and 5 it is to be noted that the thicknesses of the various layers of the product, as there shown, are not intended to accurately represent any particular relative thicknesses, the figures being in general greatly enlarged and being present only for the purpose of assisting in an understanding of the present description.

BRIEF DESCRIPTION OF TYPICAL OPERATION

A typical operation for producing a product such as shown in FIGS. 4 and 5 is illustrated in FIGS. 1, 2 and 3.

The base sheet or web W is fed from a supply roll 12 to a coating unit indicated at 13 adapted to apply a seal or prime coat to the web, such a coat being indicated at 7 in FIGS. 4 and 5. In the case of using felt as the web or base, much of the material of the seal coat may penetrate into or be absorbed by the felt. Any of the well known types of coating devices may readily be employed for applying the seal coat.

Following application of the seal coat a drying operation is effected, for instance by a dryer indicated at 14, and the web is then fed to a coating unit indicated at 15 in which a layer of a resin composition is applied containing dispersed therein the foaming or blowing agent. A coating of this type may be applied in a variety of ways and by means of various different types of coating equipment, including the reverse roll coater indicated at 15 in FIG. 1. A foamable coat applied in this way is indicated at 8 in FIG. 4.

After application of the foamable coat or layer the web is passed through an oven indicated at 16 which is operated in a manner to gel the coating applied at 15, so that subsequent coatings may be applied. After leaving the oven the web may be rolled up as at 17.

Thereafter the roll 17 may serve as the supply roll for the treatments effected in the equipment illustrated in FIG. 2.

In this illustrative treatment the catalyst deactivator is next applied, this being effected by the printing stage indicated generally at 18 and this unit may comprise any of various types of printing equipment, for instance a rotogravure type of printer adapted, for example, to print a network of areas simulating mortar joints between small tile or stones, such as indicated at 9 in FIGS. 4 and 5. The printing composition contains the agent for deactivating or destroying the action of the catalyst, i.e., for suppressing or eliminating the tendency of the catalyst (subsequently applied) to lower the decomposition temperature of the foaming agent and thus curtail the foaming which would otherwise occur in the printed areas at the temperature of the subsequent heating of the product. After printing, the web is dried by a dryer shown at 19 and the web may then be passed to the equipment for applying the catalyst.

The catalyst coating may be applied in various ways and by various different devices, such as the roll coater indicated at 20. The catalyst coating here applied contains an agent acting to lower the decomposition temperature of the foaming agent dispersed in the coating applied at 15. The catalyst coated web then passes around a heated roll 21, for instance a roll having a chromium surface and of substantial diameter so as to provide an appreciable heating of and thus gel the materials of the catalyst coat sufficiently to permit subsequent handling and coating. Cooled rolls 22 and 23 may be employed after leaving the heated roll 21 so that the temperature of the web may be reduced before subsequent handling or rolling up. Such a catalyst coat is indicated in FIGS. 4 and 5 by the reference numeral 10.

The roll 24 may serve as the supply source for the treatments effected in FIG. 3. Here the web is passed through another coating unit indicated at 25, for instance a reverse roll coater of known type, in which a transparent or wear layer is applied to the product, such as the wear layer indicated at 11 in FIGS. 4 and 5.

It may here be noted that the sectional view of FIG. 4 represents the condition of the product after the coating has been applied at 25, and prior to entry of the web into the final heating oven 26. In the oven 26 the resin materials of the various coatings, especially the foamable coat, the catalyst coat and the top or wear layer, are fused, and the entire laminate is consolidated. At the same time the foaming agent in the foamable coat 8 is decomposed in selected pattern areas, as will be further explained, so as to produce the desired cellular structure in the foamable coat and thus develop the relief pattern effect. FIG. 5 represents the cross section of the product after leaving the oven 26. The product may then be rolled up as indicated at 27.

While FIGS. 1, 2 and 3 illustrate various of the operations being carried out in a discontinuous manner, with the web rolled up at certain stages, it will be understood that the entire process may be carried out continuously by appropriate arrangement of the equipment.

Examples of Typical Materials and Compositions

In all formulations given herein, the parts referred to are parts by weight, unless otherwise indicated.

Resin Materials

For at least most of the coatings applied, it is preferred to employ polyvinyl chloride resin materials, especially as plastisols or organosols. Various of these materials are commonly referred to (by their use) as paste or dispersion type polyvinyl chloride resins.

Resins usable for many purposes herein may vary over some appreciable molecular weight range, it being preferred to employ a resin of lower molecular weight for the foamable coat and a resin of higher molecular weight for certain other purposes such as the top wear layer. For example, for certain of the compositions employed, particularly for the foamable coating, a polyvinyl chloride resin of molecular weight resulting in a relative viscosity of 2.05, measured as indicated below, is suitable.

For certain other compositions, for instance the top coating, a polyvinyl chloride resin having a relative viscosity of about 2.65 is suitable.

The relative viscosity values here mentioned were taken in accordance with the following procedure:

A 1 percent solution of the resin is made up in cyclohexanone and is passed through an Ostwald Viscometer (1 millimeter capillary), and the time of flow is compared with that for pure cyclohexanone. This comparison is run in a water bath at 25° C. The relative viscosity, i.e., the viscosity figures given above, is the ratio of the flow time of the 1 percent solution to the flow time of pure cyclohexanone, as measured at 25°C.

For printing inks more soluble vinyl resins than the paste or dispersion type resins are preferred. These resins preferably contain small amounts of copolymerization constituents such as vinyl acetate. These may be referred to as solution type resins.

Base

With regard to the base or web W to which the various materials are applied, as already noted in production of floor coverings, such web desirably comprises a felt base, for instance a mineral fiber web such as an asbestos felt, or an organic felt, either of which may incorporate saturants of types which are well known in the floor covering industry. For various products, other forms of flexible base may be utilized, such as paper, cloth, metal foils or sheets, or plastic or resinous strips or sheets which would withstand the heat applied to fuse the resin materials. If desired the web employed may even constitute a carrier of a type which is intended to be stripped from the laminate formed so as to produce a product without a base. In some instances the base side of such a product may be used as the displayed or face side thereof.

Seal Coat

The application of a seal coat or prime coat is not essential, and its use will depend somewhat upon the nature of the base employed and also upon the ultimate use for which the product is intended. The prime coating composition may be made up of a synthetic latex, such as an acrylic polymer, with or without pigments or fillers, for instance a formulation such as indicated just below:

EXAMPLE A

For each 100 parts of the acrylic polymer (in this case an acrylic emulsion copolymer consisting of 35–40 percent ethyl acrylate and 60–65 percent methyl methacrylate)

80 parts of clay 80 parts of water.

A formulation of the kind just above not only provides good bonding with the fibers of the base sheet, but further presents a surface to which the vinyl type of compositions subsequently applied have good adherence.

Since the specific composition of the prime coat is not per se a part of the present invention, the possible variants need not be extensively considered herein.

Foamable Coat

Preferably dispersion type polyvinyl chloride resins are employed in the foamable layer and the composition of the material applied will vary somewhat according to the method to be employed in applying this layer. In the case of a reverse roll coater, such as shown at 15 in FIG. 1 the composition should be formulated so as to provide a liquid material, for instance according to he following example:

EXAMPLE B the

For each 100 parts of resin (homopolymer dispersion PVC resin of 2.05 relative viscosity):

| (a) | Butylbenzyl phthalate | 56.0 |
| (b) | Mineral spirits | 4.2 |
| (c) | Epoxidized soya oil | 6.4 |
| (d) | Titanium dioxide | 7.4 |
| (e) | Azodicarbonamide | 2.5 |

Ingredients (c), (d) and (e) are preferably preliminarily ground as a paste, which is thereafter added to a batch of the other ingredients, including the resin itself, which have previously been intermixed.

Certain usable variations in the ingredients and the quantities thereof in the foamable coating are to be noted.

Various plasticizers may be used either with or in substitution for the butylbenzyl phthalate referred to above, for instance dioctyl phthalate.

The pigment (item (d)) may either by omitted or replaced by other pigments or coloring materials, for instance carbon black, although for most purposes a light shade or white background is preferred for pattern effects, as is provided by the titanium dioxide included in the above example.

In a typical formulation such as above given, various of the ingredients may be varied in quantity employed. For example item (a) — the plasticizer — may be varied from about 30 parts to about 80 parts per 100 parts of resin. Many different plasticizers may be used, as is well known in formulation of resins of the kind here employed. Mineral spirits (item (b)) need not necessarily be included but can be present up to 10 or 15 parts, depending upon the viscosity required for the particular coating operation used. A stabilizer such as the epoxidized soya oil may be present in amounts ranging from 2 to 9 parts per 100 parts of resin. This ingredient aids in stabilizing the resin against discoloration due to heating.

While azodicarbonamide is preferred, certain other foaming agents may be used, for instance p,p'-oxybis (benzene sulfonyl semicarbazide) and p-toluene sulfonyl semicarbazide. The foaming agents above referred to have decomposition temperatures as indicated just below:

| Azodicarbonamide | 380–395°F. |
| p,p'-oxybix (benzene sulfonyl semicarbazide) | 410–425°F. |
| p-toluene sulfonyl semicarbazide | 415–430°F. |

From the above it will be seen that foaming agents having decomposition temperatures within a range extending from about 370° F. to about 440° F. are usable.

Agents having such decomposition temperatures, when appropriately catalyzed will decompose to produce good quality foam at temperatures about 50° lower, and thus within the range in which it is practical to effect fusion without degradation of the resin materials.

The amount of foaming agent employed may vary from about ½ part to about 20 parts by weight per 100 parts of the resin. The quantity needed will vary somewhat in accordance with the particular foaming agent being used. When using azodicarbonamide, as is preferred, the amount may run from about ½ part to about 4 or 5 parts by weight per 100 parts of the resin, but not much increase in porosity is developed beyond about 3.5 parts.

The thickness of the foamable layer will vary in accordance with the usage and the degree of cellular expansion desired, a typical range being a thickness between about 0.005 to 0.020 inch. However, for certain purposes a thickness up to about 0.04 inch may be used.

Catalyst Deactivator

The nature or character of the catalyst deactivator should be considered in connection with the character of the catalyst employed to lower the decomposition temperature of the foaming agent. Various metal containing organic compounds, particularly compounds containing zinc and lead are effective catalyzing agents, as is more fully brought out herebelow. In various catalysts of this type the metal is the active ingredient, and with this in mind the catalyst deactivators or suppressants to be employed react with the catalyst metal, possibly by some chelating action, thereby destroying, inactivating or "poisoning" the catalyst. Whatever "mechanism" is involved, the use of the combinations of catalysts and deactivators herein disclosed results in destruction of the catalyst before it has an opportunity to influence the decomposition temperature of the foaming agent. As compared with certain prior techniques, the present method results in greater density in the valleys of the relief pattern, and thereby produces greater contrast between the density of the thick, foamed areas of the pattern on the one hand and of the thin, dense areas of the pattern on the other hand. The thin, dense areas, of course, are those pattern areas to which the deactivator is applied.

The deactivator to be employed will depend upon the catalyst used in the catalyst layer subsequently applied, different deactivators being required for different catalysts. In general, one group of deactivators are effective with reference to the zinc containing catalysts, and another group of deactivators are effective with reference to the lead containing catalysts.

With zinc containing catalysts, the preferred deactivators or suppressants are benzotriazole and aminotriazole. With lead catalysts the preferred deactivators are in general deactivators of acidic character, for instance tetrahydrophthalic anhyride, tetrachlorophthalic anhydride and terephthaloyl chloride. N,N,N',N'-tetrakis (2-hydroxypropyl) ethylene diamine may also be used with lead catalysts.

In some instances, a deactivator will serve the intended purpose with either a zinc or a lead containing catalyst. This is true of 8-hydroxy quinoline and of N-phenyl glycine.

The formulation of the composition in which the deactivator is applied or printed will depend somewhat upon the characteristics of the particular deactivator being employed. In some cases the composition is preferably of the dispersion resin type, and in other cases it is preferably of the solution base type.

A suitable dispersion type printing composition for use with a zinc containing catalyst may be made up with a high molecular weight homopolymer dispersion PVC resin of 2.65 relative viscosity, according to the following formulation:

EXAMPLE C

For each 100 parts of resin:

| | |
|---|---|
| Dioctyl adipate | 96.0 |
| Polyethylene glycol monolaurate | 1.8 |
| Benzotriazole | 25.0 |

The foregoing composition incorporates no coloring matter or pigment, but this is not necessarily present in the deactivator composition. A pigment may be added to a composition of the foregoing type if desired, and for most purposes it is preferred to employ coloring material in the deactivator composition, because thereby a color pattern effect is secured in addition to and in registry with the relief pattern effect being produced.

Wherever reference is made herein to the use of pigments, that term is to be understood in a broad sense, since various coloring materials, even dyes may be employed, the specific nature of the coloring materials not being a part of the present invention per se.

The quantity (25 parts) of benzotriazole present in the foregoing composition produces appreciable suppressing effect on the zinc catalyst for the foaming agent when employed with a foamable composition such as that heretofore referred to, but for most purposes a more pronounced deactivating action is desirable in order to accentuate the relief effect of the product, and this is achieved by increasing the quantity of benzotriazole present in the printing ink, above that indicated in the above example. On the basis of the weight of the resin present in the printing ink, the quantity of benzotriazole employed may run from about 40 parts by weight up to about 105 parts by weight, but most advantageously will fall in the range from about 70 parts by weight to about 100 parts by weight. Within that range and with ordinary printing techniques it will be found that the benzotriazole will effectively destroy the action of the catalyst. These ranges of concentration of the deactivator is representative of the ranges which are usable with deactivators contemplated according to the invention.

As an example of a solution type of ink, the following may be employed, this ink being made up of approximately equal parts of two resin constituents, one constituent comprising a copolymer of vinyl chloride and vinyl acetate containing 10 percent vinyl acetate, and the other resin constituent comprising a terpolymer containing 86 percent vinyl chloride, 13 percent vinyl acetate, and 1 percent maleic acid.

EXAMPLE D

For each 100 parts of the resin:

| | |
|---|---|
| Dioctyl phthalate | 12.2 |
| Xylol | 192.0 |
| Methyl isobutyl ketone | 65.0 |
| Methyl ethyl ketone | 433.0 |
| Titanium dioxide | 240.0 |
| Benzotriazole | 80.0 |

In connection with Example D just above, it is to be noted that the resin employed may be varied, for instance the ratio of the two constituents referred to may be altered, for example from about 3–1 to 1–3.

The solution type of ink dries by evaporation of the solvent constituents present and requires less heat than the dispersion type of ink, but either may be employed with appropriate ink drying following the printing. Although Example D employs titanium dioxide as a pigment, "Processing Examples" referred to toward the end of this specification show the use of the same and also of similar deactivator compositions containing various colored pigments instead of titanium dioxide. In this way color pattern effects of color contrasting with that of the underlying foamable coat can be secured.

The following is an example illustrating the use of aminotriazole in a printing composition, which is also preferably employed in a system where the catalyst is a zinc containing compound.

EXAMPLE E

For each 100 parts of the resin (same as in Example D):

| | |
|---|---|
| Methyl ethyl ketone | 280.0 |
| Xylol | 152.0 |
| Methyl isobutyl ketone | 45.0 |
| Aminotriazole | 95.0 |

Where aminotriazole is employed, the quantity thereof may be varied through about the same range as mentioned above for benzotriazole, the deactivating action of the aminotriazole being of similar character to that secured by the benzotriazole.

An example of a formulation incorporating a deactivator for use with a lead containing catalyst is given just below, in this instance the deactivator being tetrahydrophthalic anhydride.

EXAMPLE F

For each 100 parts of resin (same as in Example D):

| | |
|---|---|
| Dioctyl phthalate | 12.2 |
| Xylol | 192.0 |
| Methyl isobutyl ketone | 65.0 |
| Methyl ethyl ketone | 433.0 |
| Titanium dioxide | 240.0 |
| Tetrahydrophthalic anhydride | 85.0 |

Other deactivators usable with lead containing catalysts may be substituted in the foregoing formulation, for instance terephthaloyl chloride or N,N,N',N'-tetrakis (2-hydroxypropyl) ethylene diamine.

Still further, 8-hydroxy quinoline and N-phenyl glycine which are effective on both zinc and lead containing catalysts, may be substituted in various of the formulations above. However, there are certain differences obtainable by employment of different catalyst deactivating agents. For example, while benzotriazole is soluble in the solvents which are employed in formulating certain printing compositions, aminotriazole is not soluble in such solvents. Benzotriazole will have a plasticizing influence upon the ink composition, tending to render the ink tacky, especially when used in relatively large amounts. Because the aminotriazole is not soluble in the solvent base of the ink, it is necessary to grind this agent somewhat in the manner of a pigment and it is also possible to load the ink with a some-what higher quantity of aminotriazole, which is advantageous for some purposes, especially where a very strong deactivating influence on the catalyst is desired. The agent 8-hydroxy quinoline is one which may also be employed in a solution type ink formulation of the kind referred to above as Example D.

Catalyst Layer

A number of metal containing organic compounds may be used, especially compounds of zinc or lead. In general the usable compounds are zinc or lead salts of organic acids, especially of fatty acids, such as stearates, palmitates, laurates, or salts of other organic acids, such as resinates, and especially zinc or lead naphthenate and also zinc or lead octoate, the naphthenates and the octoates being preferred catalysts which may be used either by themselves or intermixed. Certain cadmium compounds such as cadium octoate may also be used in combination with other catalysts, preferably zinc compounds. Some of these catalysts also additionally serve as light stabilizers for the resin materials.

Organic barium compounds (sometimes employed to stabilize vinyl chloride compositions) are not usable as catalysts according to the present invention, because the barium compounds tend to raise the decomposition temperature of certain foaming agents, instead of lowering their decomposition temperature, as is contemplated by the invention.

A typical formulation for the catalyst composition is made up with dispersion type polyvinyl chloride resin, as follows:

EXAMPLE G

For each 100 parts of a relatively high molecular weight PVC resin of 2.65 relative viscosity:

| a) | 2-ethyl hexyl adipate | 50.0 |
| b) | Polyethylene glycol monolaurate | 1.5 |
| c) | Zinc octoate (16% zinc) | 37.5 |

In the above formulation, for Item a), other plasticizers may be used, and the quantity thereof may vary in accordance with a number of factors including the consistency or hardness of the material desired, for instance from about 40 parts to 80 parts may be employed for each 100 parts of resin.

Item b) is a surfactant and various materials for this purpose may be employed as is well known.

Item c) represents the important active ingredient here, namely the catalyst for lowering the decomposition temperature of the foaming agent.

As the metal in the catalysts is the active ingredient, the quantity employed should be based upon the amount of metal present. Moreover, because the action here concerns the decomposition of the blowing agent, the significant quantity relationship to be observed is the relationship between the metal content of the catalyst and the amount of the blowing agent to be catalyzed. Thus the quantity of catalyst employed and the quantity of the catalyst-containing composition applied to the foamable coat should be such as to yield from 0.05 parts to 0.25 parts of the catalyst metal for each part of foaming agent in the foamable layer, the preferred range being from 0.15 to 0.20 parts.

Examples of the lead-organic compounds which may be used to catalyze the decomposition of the foaming agent are lead octoate (24 percent lead), and lead naphthenate (24 percent lead). In the event of using lead octoate in Example G above instead of the zinc octoate, it would be appropriate to employ 25 parts of the lead octoate, instead of the 37.5 parts indicated for zinc octoate.

The selection of the particular catalyst to be used will depend upon a number of factors, including the catalyst deactivator to be selected as already noted above.

The layer of the catalyst composition applied need only be very thin, for instance of the order of a few mils.

Top Coat

It is first pointed out that a top coat need not necessarily be employed, depending upon the character and use of the product being made. In most instances, for floor covering purposes, it is desirable to employ a transparent top coat, comprising a wear layer at the top of the laminate. An example of such a top coat is given just below.

EXAMPLE H

For each 100 parts of a high molecular weight homopolymer dispersion PVC resin of 2.65 relative viscosity:

| Dioctyl phthalate | 35.0 |
| Epoxidized soya oil | 7.0 |
| Polyehtylene glycol monolaurate | 0.8 |
| Light stabilizer | 5.0 |
| High boiling mineral spirits | 18.0 |

Variations in the composition of the top coating may of course be resorted to according to known factors but since the specific composition of the top coating is not a part of the present invention per se, such variations need not be considered herein.

The following is another example of a clear top layer or wear coat.

EXAMPLE I

For each 100 parts of a high molecular weight homopolymer dispersion grade PVC resin of 2.65 relative viscosity:

| 2,2,4-Trimethyl pentanediol isobutyrate benzoate | 42.0 |
| Light stabilizer | 5.0 |
| Epoxidized soya oil | 6.0 |
| High boiling mineral spirits | 6.3 |
| Alkylphenyl ether of polyethylene glycol | 0.6 |

Treatment Temperatures

Where a seal coat is applied, for instance of the type mentioned above in Example A, the heating following application of that coat, for instance as by the dryer indicated at 14 in FIG. 1, need only be sufficient to dry the latex, this being accomplished, for example at a temperature from about 150° F. to 300° F.

The heating in oven 16 shown in FIG. 1 following the application of the foamable coat, for instance a coating of the kind referred to above under Example B should only be sufficient to gel the foamable coat, and preferably this heating should be controlled to avoid any substantial fusion, because fusion tends to restrict the desired penetration of the subsequently applied catalyst in the areas in which the catalyst has not been deactivated. An appropriate heating for this purpose would be attained with an oven temperature from about 225° F. to about 275° F. with a residence time of the web in the oven from about 2 minutes to about 1 minute.

The heating following the printing of the deactivator, for instance by the heater 19 need only be sufficient to eliminate tackiness, so that the web may subsequently be coated with the catalyst. For this purpose heating at a temperature of from about 120° F. to about 180° F. will suffice, with a solution type of ink.

In connection with the heating of the catalyst layer, for instance by roll 21 shown in FIG. 2, here again relatively mild heating conditions are preferred in order to secure gelling or solidification without fusion. Heating at a temperature from about 250° F. to about 300° F. for a time of about 10 seconds to 5 seconds is sufficient for this purpose.

All of the heating stages referred to just above should, of course, be conducted in a manner to avoid any appreciable decomposition of the foaming agent. Decomposition of the foaming agent and also the fusion of the various resin materials is contemplated as the last heating stage which, in the system diagrammed in FIGS. 1–3 is effected in the oven 26. For this purpose the web should have a residence time of about 5 minutes to about 2 minutes in the oven, with the oven air temperature maintained at from about 340° F. to about 400° F.

Variations in Coating Sequence

According to FIGS. 1–5 a product is made in which a laminate is produced including a foamable layer, deactivator printing in selected pattern areas, a catalyst layer, and a wear layer, these elements of the laminate being built up one upon another in the sequence just mentioned. In the technique as illustrated in FIGS. 1–5 the deactivator composition preferably includes coloring material so as to contribute color pattern effect in registry with the relief pattern effect developed. In view of this, the catalyst coating and also the top wear layer should preferably be clear or transparent, so that the color pattern effect will be visible.

Where the deactivator is applied in selected pattern areas between the foamable layer and the catalyst layer, the catalyst layer may itself be of sufficient thickness to constitute a wear layer, and in this variation of the operation illustrated in the drawings, after the application of the catalyst layer, the product may be passed directly to an oven such as indicated at 26 in FIG. 3, instead of through the additional coating stage indicated at 25.

Other variations may be resorted to, as follows:

For example the foamable layer may first be laid down and this may be followed by application of a catalyst layer on top of the foamable layer, this being followed by application of the catalyst deactivator in spaced pattern areas. As in FIGS. 1–5, this embodiment also results in location of the deactivator composition at one face of the catalyst layer. In this embodiment, moreover, a top coat may be applied if desired, and in this alternative embodiment, it is also contemplated that the top wear layer, if used, will be transparent so that a color pattern effect introduced by formulating the deactivator composition with pigment or other coloring material may be visible from the top of the product.

Certain other sequences of application of the elements or layers of the laminate may also be resorted to, for instance the catalyst deactivator composition may first be printed upon a base (or upon a seal coat carried by a base). The catalyst layer may be applied over this printing, and this may be followed by the foamable layer after interaction of the deactivator with the catalyst, and finally, if desired, a top or wear coat. This also brings the catalyst deactivator to one face of the catalyst layer, but in this particular embodiment it is not practical to introduce a color pattern effect in registry with the relief pattern effect by incorporating coloring material in the printing composition, for the reason that the foamable layer overlies the printing; and as the foamable layer is inherently opaque, it will obscure the printing from view. A similar variant contemplates a sequence in which the catalyst layer is first applied to a base and this is followed by catalyst deactivator printing and then by application of the foamable layer (with or without an added top coat). This also brings the deactivator printing to a face of the catalyst layer, but since the foamable layer lies above the printing, a color pattern effect introduced by the printing would not be visible. These last two embodiments therefore are of use primarily in forms of the product which are characterized only by a relief pattern effect, rather than by a combination of a relief pattern effect with a color pattern effect.

Processing Examples

Example 1

An organic felt was used as the base sheet. This was treated with a seal coat in accordance with Example A above, which was dried at a temperature of about 250° F.

Thereafter a foamable coat in accordance with Example B (containing azodicarbonamide), was applied to a thickness of 0.010 inch, and this coat was gelled by heating for 1 ½ minutes at 250° F.

The catalyst deactivator was then printed on the foamable coat in pattern areas representing mortar joints between small irregular tiles. The catalyst deactivator used was benzotriazole which was employed in a composition in accordance with Example D above, except that the composition was pigmented to a gray color. After printing the catalyst deactivator, it was subjected to drying under typical conditions for drying printing inks.

A catalyst coat (containing zinc octoate) was then applied, the composition of this coat conforming with that given above as Example G, and after application of the catalyst coat, this layer was heated for 10 seconds at about 275° F.

A transparent top coat was then applied in accordance with the formulation given above as Example I. Thereafter the product was finally heated to fuse the resin material and decompose the foaming agent in the areas where the catalyst was not deactivated. This heating was effected for 3 ½ minutes at 355° F.

The product produced had good quality foam of fine cell structure, and had a pronounced relief effect, the areas of the product between those in which the catalyst was deactivated being about 250 percent of the thickness of the areas in which the catalyst was deactivated.

Example 2

This example uses the materials and techniques referred to in Example 1, with the following exceptions.

The composition containing the catalyst deactivator conformed with that given above as Example F (containing tetrahydrophthalic anhydride).

The catalyst employed was lead octoate (24 percent lead) and this catalyst was used instead of the zinc octoate in a formulation according to Example G above.

The product thus produced has good embossing and good quality foam of which the thickness in the tile areas was about 220 percent of the thickness in the mortar joints.

Example 3

This example uses the materials and techniques referred to in Example 1 with the following exception.

Instead of employing azodicarbonamide in the foamable coat, 5 parts of p-toluene sulfonyl semicarbazide were used in a formulation otherwise conforming with that of Example B above.

The product here obtained had a relatively dense and tough foam, with the thickness of the foamed tile areas about 180 percent of the thickness of the mortar lines.

Example 4

An organic felt was used as the base sheet. This was treated with a seal coat in accordance with Example A above, which was dried at a temperature of about 250° F.

Thereafter a foamable coat in accordance with Example B above (containing azodicarbonamide), was applied to a thickness of 0.010 inch. This layer was gelled by heating for 1 ½ minutes at 250° F.

A catalyst coat was then applied in accordance with Example G above (containing zinc octoate), and this layer was heated for 10 seconds at 275° F.

A catalyst deactivator printing composition in accordance with Example D above, but pigmented to give a dark brown color, was then printed in a pattern representing mortar joints between small irregular shaped tiles, and this was followed by drying under typical drying conditions for printing inks.

A transparent top coat according to Example H above was then applied and the product was finally heated to fuse the resin materials and decompose the foaming agent, this heating being effected in an oven maintained at an air temperature of 355° F. with a residence time of 3 ½ minutes.

This produced a product having a good quality fine cell foam structure, with a pronounced relief effect, the areas of the product between the printed areas being about 200 percent of the thickness of the printed areas.

Example 5

This example uses the materials and techniques referred to in Example 4, with the following exceptions.

The foamable coat conformed with Example B except that 2,2,4-trimethyl pentanediol isobutyrate benzoate was substituted for the butylbenzyl phthalate.

The deactivator printing composition conformed with Example D, except for pigmentation to a brown color.

Instead of employing a transparent top coat according to Example H, the present example (5) used a top coat in accordance with Example 1.

This produced a product in which the areas between the printed areas were about 200 percent of the thickness of the printed areas.

Example 6

This example uses the materials and techniques referred to in Example 2, with the following exceptions.

The foamable coat conformed with Example B except that 2,2,4-trimethyl pentanediol isobutyrate benzoate was substituted for the butylbenzyl phthalate, and except for the addition of 0.50 parts of an organotin light stabilizer.

Instead of employing a transparent top coat according to Example H, the present example (6) used a top coat in accordance with Example 1.

The product produced in accordance with this example yielded a foam of very good quality and having a pronounced embossed effect, the thickness of the foamed tile areas being about 200 percent of the mortar lines.

Example 7

In this example a seal coat was applied to an organic felt base sheet as in Example 1.

The foamable coat employed conformed with Example B except that 2,2,4-trimethyl pentanediol isobutyrate benzoate was substituted for the butylbenzyl phthalate. This foamable coat was gelled by heating for 1 ½ minutes at 250° F.

In this example, instead of applying the catalyst coat on top of the foamable coat, the deactivator composition was first applied, being printed in pattern areas representing mortar joints between small tiles. The depressant composition conformed with Example D, except for pigmentation to a brown color. The product was then dried under typical drying conditions suitable for printing inks.

Following the printing operation a clear top coat was applied, this top coat conforming with Example 1 above, except for the substitution of 11 parts of zinc-cadmium catalyst for the light stabilizer. The product was then heated to gel the top coat at a temperature of 250° F. for 2 ½ minutes, and this was followed by heating to fuse the resin materials and decompose the foaming agent, at a temperature of 355° F. for 3 ½ minutes.

The quality of the foam produced was good and a substantial degree of embossing was obtained, the thickness of the foamed tile areas being 180 percent of the thickness of the mortar lines.

I claim:

1. A method for making a decorative sheet type covering product having a relief pattern effect, comprising applying to a base sheet a first layer of polyvinyl chloride resin material having dispersed therein a thermally decomposable foaming agent, laminating two additional coating materials with said first layer, one being a second layer comprising a catalytic agent acting to lower the decomposition temperature of said foaming agent, and the other comprising an agent selected from the group consisting of benzotriazole and aminotriazole, said agent acting to deactivate the catalytic agent, the deactivating agent being applied in spaced pattern areas lying at one face of the layer comprising the catalytic agent, and heating the laminate to a temperature sufficient to effect substantial decomposition of the foaming agent in the areas of said first layer intervening between the deactivated pattern areas and thereby expand the thickness of the intervening areas as compared with the areas of the first layer in registry with the deactivated pattern areas, and thus develop a relief pattern effect.

* * * * *